(12) United States Patent
Lin

(10) Patent No.: US 10,237,934 B1
(45) Date of Patent: Mar. 19, 2019

(54) LIGHT SOURCE SWITCHING SYSTEM AND METHOD OF LIGHT EMISSION CONTROL THEREOF

(71) Applicant: Chicony Power Technology Co., Ltd., New Taipei (TW)

(72) Inventor: Chen-Chi Lin, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/029,933

(22) Filed: Jul. 9, 2018

(30) Foreign Application Priority Data

May 11, 2018 (TW) .............................. 107116174 A

(51) Int. Cl.
H05B 33/08 (2006.01)

(52) U.S. Cl.
CPC ..... *H05B 33/0821* (2013.01); *H05B 33/0845* (2013.01)

(58) Field of Classification Search
None
See application file for complete search history.

(56) References Cited

U.S. PATENT DOCUMENTS

| 5,209,560 | A |   | 5/1993 | Taylor |   |
|---|---|---|---|---|---|
| 5,666,028 | A |   | 9/1997 | Bechtel |   |
| 5,769,527 | A |   | 6/1998 | Taylor |   |
| 2005/0039967 | A1 |   | 2/2005 | Aube |   |
| 2008/0136350 | A1 | * | 6/2008 | Tripathi | H05B 33/0803 315/294 |
| 2011/0316449 | A1 | * | 12/2011 | Imanaka | H05B 33/0815 315/307 |
| 2013/0264954 | A1 | * | 10/2013 | Chung | H05B 33/083 315/186 |
| 2016/0172981 | A1 | * | 6/2016 | Gritti | H02M 3/33507 363/21.12 |
| 2017/0184294 | A1 | * | 6/2017 | Tao | F21V 25/04 |

FOREIGN PATENT DOCUMENTS

| CN | 101339738 A | 1/2009 |
|---|---|---|
| CN | 104210416 A | 12/2014 |
| CN | 104582183 A | 4/2015 |
| CN | 206226794 U | 6/2017 |
| CN | 107303837 A | 10/2017 |
| TW | 21524260 A | 6/2015 |

* cited by examiner

*Primary Examiner* — Crystal L Hammond
(74) *Attorney, Agent, or Firm* — Muncy, Geissler, Olds & Lowe, P.C.

(57) ABSTRACT

A light source switching system and a method thereof include a signal input terminal; first, second and third input circuits; a dimming control unit; a DC conversion unit; first and second switch circuits; and first, second and third light emitting elements. The second and third input circuits respectively include first and second detection units and first and second switch driving units. The DC conversion unit is connected to the first, second, and third input circuits and the dimming control unit. The first and second switch circuits are respectively connected to the DC conversion unit and the first and second switch driving units. The first light emitting device is connected to the DC conversion unit. The second and third light emitting devices are respectively connected to the first and second switch circuits, wherein the first, second and third light emitting devices are connected in parallel with each other.

18 Claims, 4 Drawing Sheets

LIGHT SOURCE SWITCHING SYSTEM AND METHOD OF LIGHT EMISSION CONTROL THEREOF

BACKGROUND OF THE INVENTION

1. Field of the Invention

The present invention relates to a light source switching system and a method of light emission control thereof, particularly to a light source switching system applicable to a plurality of light emitting diodes (LEDs) simultaneously.

2. Description of the Related Art

The lighting system of today's cars contains lamps with various functions, such as daytime running lamps, high/low beam, turn lamps, fog lamps, and position lamps. Due to energy saving and styling requirements, various types of lamps have gradually been changed from halogen lamps to light emitting diode (LED) lamps. However, in the prior art, LED lamps with different functions use their own power supply for LED driving. This approach results in drawbacks, such as larger LED power supplies, higher costs, more electronic materials and waste of resources.

Accordingly, it is necessary to devise a light source switching system and a method of light emission control thereof to overcome the drawbacks in the prior art.

SUMMARY OF THE INVENTION

It is a major objective of the present invention to provide a light source switching system having the effect of being applicable to a plurality of light emitting diodes (LEDs) simultaneously. Further, the present invention can employ a switching power supply to simultaneously turn on a plurality of LEDs connected in series. In particular, it can process a switched power supply architecture where the negative output is not connected to the negative input, such as buck-boost.

It is another objective of the present invention to provide a method of light emission control used in the system described above.

To achieve the above objectives, a light source switching system in the present invention includes a signal input terminal; first, second, and third input circuits; a dimming control unit; a DC conversion unit; first and second switch circuits; and first, second and third light emitting elements. The first input circuit is electrically connected to the signal input terminal. The second input circuit includes a first detection unit and a first switch driving unit. The first detection unit is electrically connected to the signal input terminal. The third input circuit includes a second detection unit and a second switch driving unit. The second detection unit is electrically connected to the signal input terminal. The dimming control unit is electrically connected to the second input circuit and the third input circuit. The DC conversion unit is electrically connected to the first, second, and third input circuits and the dimming control unit. The first switch circuit is electrically connected to the DC conversion unit and the first switch driving unit. The second switch circuit is electrically connected to the DC conversion unit and the second switch driving unit. The first light emitting device is electrically connected to the DC conversion unit. The second light emitting device is electrically connected to the first switch circuit. The third light emitting device is electrically connected to the second switch circuit. Specifically, the first, second, and third light emitting devices are connected in parallel with each other.

The method of light emission control in the present invention includes the following steps: detecting whether a signal input terminal outputs a first input signal; if yes, outputting a first turn-on signal to the first switch unit; and transmitting a first power signal converted and output by the DC conversion unit to the first light emitting device.

DETAILED DESCRIPTION OF THE PREFERRED EMBODIMENT

Hereafter, the technical content of the present invention will be better understood with reference to preferred embodiments.

Figure 1:
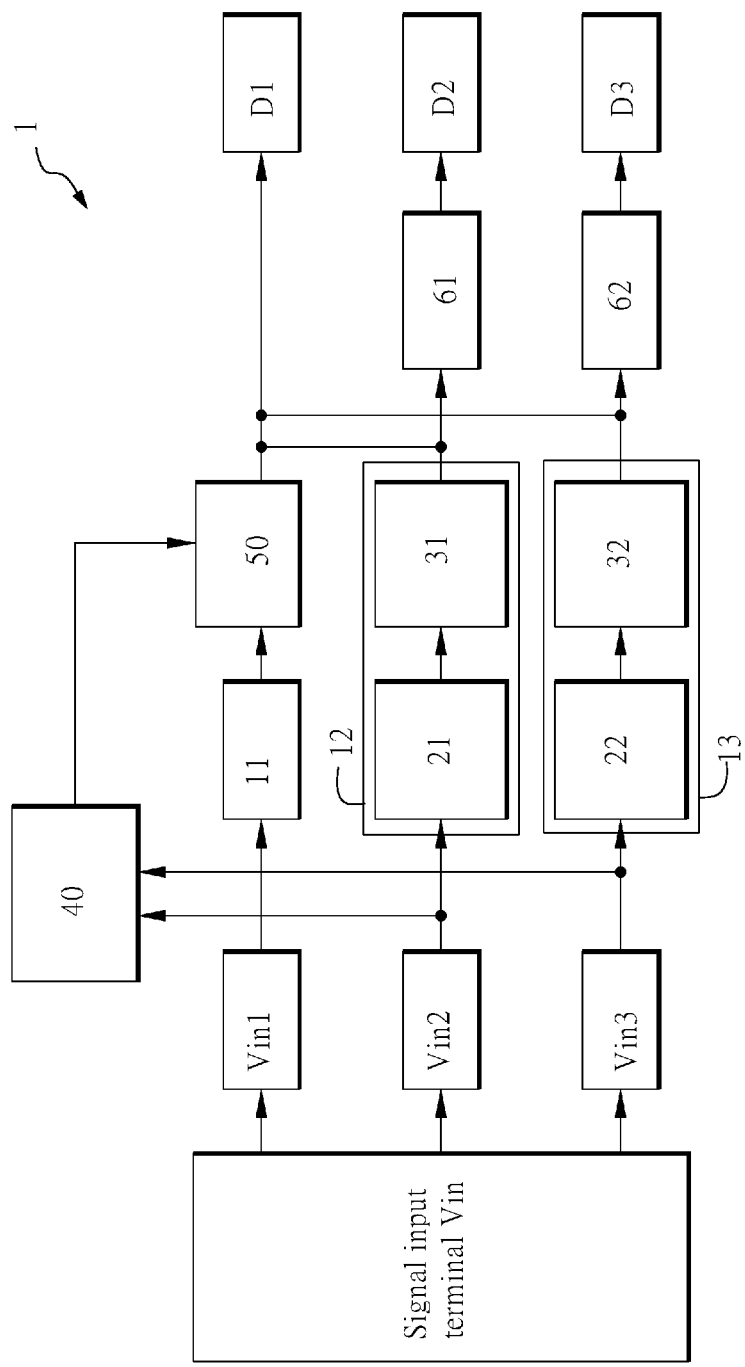
FIG. 1 is an architecture diagram of a light source switching system in the present invention.

Please first refer to FIG. 1, which is an architecture diagram of a light source switching system in the present invention. It should be noted that although the following description uses the terms "first", "second", etc. to describe various elements, these elements should not be limited by the terms. These terms are only used to distinguish one element from another one. For example, a first light emitting device may be referred to as a second light emitting device; similarly, the second light emitting device may be referred to as a first light emitting device without departing from the scope of various described embodiments. The first light emitting device and the second light emitting device are both light emitting elements, but they are not the same light emitting elements.

The light source switching system 1 in the present invention includes a signal input terminal Vin, a first input circuit 11, a second input circuit 12, a third input circuit 13, a dimming control unit 40, a DC conversion unit 50, a first switch circuit 61, a second switch circuit 62, a first light emitting device D1, a second light emitting device D2 and a third light emitting device D3. The signal input terminal Vin can supply the power signal to different light emitting diodes (LEDs), such as the first light emitting device D1, the second light emitting device D2 or the third light emitting device D3 in FIG. 1. The first light emitting device D1, the second light emitting device D2 and the third light emitting device D3 may be a single or a plurality of LEDs connected in series, and the first light emitting device D1, the second light emitting device D2 and the third light emitting device D3 are connected in parallel with each other.

The signal input terminal Vin is respectively electrically connected to the first input terminal Vin1 of the first input circuit 11, the second input terminal Vin2 of the second input circuit 12 and the third input terminal Vin3 of the third input circuit 13 to transmit power signals. The second input circuit 12 includes a first detection unit 21 and a first switch driving unit 31, and the third input circuit 13 includes a second detection unit 22 and a second switch driving unit 32, wherein the first detection unit 21 and the second detection unit 22 are both electrically connected to the signal input terminal Vin to determine whether the signal input terminal Vin transmits the power signal. The fast switch driving unit 31 and the second switch driving unit 32 are used to determine whether to switch the first switch circuit 61 and the second switch circuit 62 according to the signal of the first detection unit 21 and the second detection unit 22.

The dimming control unit 40 is electrically connected to the second input circuit 12 and the third input circuit 13 to determine the current supplied to the second light emitting device D2 and to the third light emitting device D3 according to requirements. The DC conversion unit 50 is electrically connected to the first input circuit 11, the second input circuit 12, the third input circuit 13 and the dimming control unit 40, and the DC conversion unit adjusts the output current based on the control of the dimming control unit 40. The first switch circuit 61 is electrically connected to the DC conversion unit 50 and the first switch driving unit 31, and the second switch circuit 62 is electrically connected to the DC conversion unit 50 and the second switch driving unit 32. Finally, the first light emitting device D is electrically connected to the DC conversion unit 50, the second light emitting device D2 is electrically connected to the first switch circuit 61, and the third light emitting device D3 is electrically connected to the second switch circuit 62. The first switch circuit 61 and the second switch circuit 62 are used to determine whether the power signal can be transmitted to the second light emitting device D2 and to the third light emitting device D3.

Further, in an embodiment of the present invention, the first input circuit 11 is kept on such that the DC conversion unit 50 continuously outputs a first power signal to the first light emitting device D1. Consequently, the light source switching system 1 can keep the first light emitting device D1 lit to confirm that the signal input terminal Vin has power input, but the present invention is not limited thereto, and the light source switching system 1 may not be provided with the first light emitting device D1.

Accordingly, when the first detection unit 21 receives a first input signal of the signal input terminal Vin, the first detection unit 21 enables the first switch driving unit 31 to output a first turn-on signal to the first switch unit, thereby transmitting a second power signal converted and output by the DC conversion unit 50 to the second light emitting device D2. When the second detection unit 22 receives a second input signal of the signal input terminal Vin, the second detection unit 22 enables the second switch driving unit 32 to output a second turn-on signal to the second switch unit to transmit a third power signal converted and output by the DC conversion unit 50 to the third light emitting device D3. The second light emitting device D2 and the third light emitting device D3 can respectively emit light through the above circuit.

In addition, when the first detection unit 21 and the second detection unit 22 simultaneously receive a first input signal and a second input signal of the signal input terminal Vin, the first detection unit 21 enables the first switch driving unit 31 to output a first turn-on signal to the first switch unit, the second detection unit 22 enables the second switch driving unit 32 to output a second turn-on signal to the second switch unit, and the DC conversion unit 50 converts a fourth power signal and a fifth power signal to be respectively transmitted to the second light emitting device D2 and to the third light emitting device D3. It can be seen that the light source switching system 1 enables the second light emitting device D2 and the third light emitting device D3 to emit light separately or simultaneously.

Figure 2:
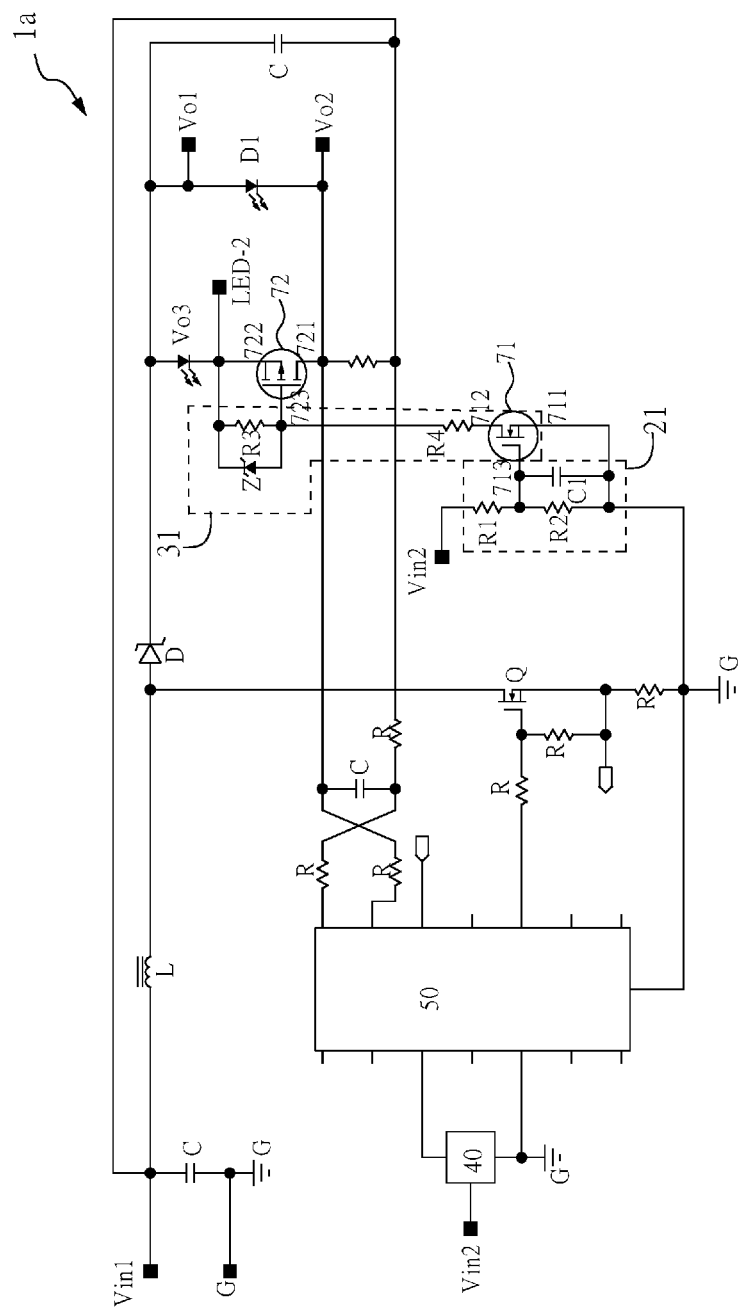
FIG. 2 is a schematic diagram showing the circuit structure of the light source switching system according to a first embodiment of the present invention.

Now, please refer to FIG. 2, which is schematic diagram showing the circuit structure of the light source switching system according to a first embodiment of the present invention. Since the circuit structures of the second input circuit 12 and the third input circuit 13 can be identical, only the second input circuit 12 is illustrated in FIG. 2 and the subsequent FIG. 3 as an example.

In a first embodiment of the present invention, the switching power supply of the buck-boost architecture such that the negative output is not connected to the negative input, but the present invention is not limited thereto. The first detection unit 21 of the light source switching system 1a includes a first resistor R1, a second resistor R2 and a first capacitor C1. The first switch driving unit 31 includes a Zener diode Z, a third resistor R3, a fourth resistor R4 and a first field effect transistor 71. The first switch circuit 61 is a P-type second field effect transistor 72. Specifically, the first field effect transistor 71 includes a first source terminal 711, a first gate terminal 713 and a first drain terminal 712, and the second field effect transistor 72 includes a second drain terminal 721, a second gate terminal 723 and a second source terminal 722. Specifically, the first resistor R1 is connected to the signal input terminal Vin and connected in series to the second resistor R2, the second resistor R2 is connected to a ground terminal G and connected in parallel to the first capacitor C1, the first gate terminal 713 is connected between the first resistor R1 and the second resistor R2, and the first source terminal 711 is connected to the ground terminal G. The third resistor R3 is connected in parallel to the Zener diode Z and connected in series to the fourth resistor R4, and the fourth resistor R4 is further connected to the first drain terminal 712. The second gate terminal 723 is connected between the third resistor R3 and the fourth resistor R4, the second drain terminal 721 is connected to the DC conversion unit 50, and the second source terminal 722 is connected to the second light emitting device D2. When necessary, the second light emitting device D2 can be connected in parallel to the third light emitting device D3 via the output terminals Vo1, Vo2.

Accordingly, when the first detection unit 21 receives a first input signal of the signal input terminal Vin or when the second detection unit 22 receives a second input signal of the signal input terminal Vin, the first field effect transistor 71 is turned on due to the divided voltage between the first resistor R1 and the second resistor R2. Consequently, the second source terminal 722 and the second gate terminal 723 of the second field effect transistor 72 are biased by the partial voltage of the third resistor R3 and the fourth resistor R4 such that the second drain terminal 721 and the second source terminal 722 of the second field effect transistor 72 are turned on. Finally, the second light emitting device D2 can emit light. If the first detection unit 21 does not receive the first input signal of the signal input terminal Vin or the second detection unit 22 does not receive the second input signal of the signal input terminal Vin, the first field effect transistor 71 surely cannot be turned on, causing the second field effect transistor 72 not to be turned on such that the second light emitting device D2 cannot emit light.

Figure 3:
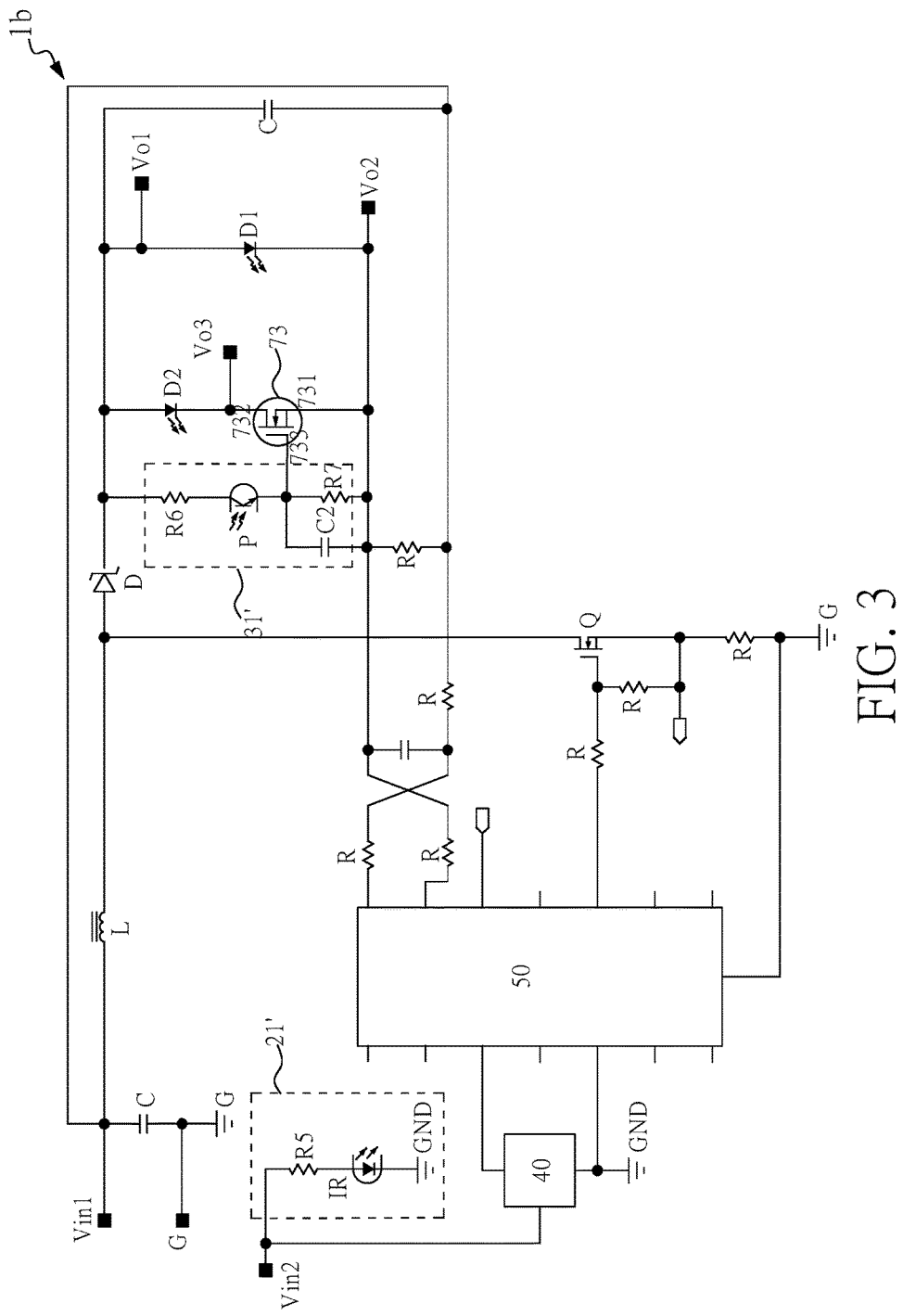
FIG. 3 is a schematic diagram showing the circuit structure of the light source switching system according to a second embodiment of the present invention.

Now, please refer to FIG. 3, which is a schematic diagram showing the circuit structure of the light source switching system according to a second embodiment of the present invention.

In the second embodiment of the present invention, the first detection unit 21' of the light source switching system 1b includes a fifth resistor R5 and an infrared light emitting device IR. The first switch driving unit 31' includes a sixth resistor R6, a seventh resistor R7, a photo-transistor P and a second capacitor C2. The first switch circuit 61 is an N type third field effect transistor 73. Specifically, the third field effect transistor 73 includes a third source terminal 731, a third drain terminal 732 and a third gate terminal 733. The fifth resistor R5 is connected to the signal input terminal Vin and connected in series to the infrared light emitting device IR. The infrared light emitting device IR and the photo-transistor P form an optocoupler. The sixth resistor R6, the seventh resistor R7 and the photo-transistor P are connected in series, and the seventh resistor R7 is connected in parallel to the second capacitor C2. The third gate terminal 733 is connected between the photo-transistor P and the seventh resistor R7. The third source terminal 731 is connected to the opposite end of the seventh resistor R7. The third drain terminal 732 is connected to the second light emitting device D2.

Accordingly, when the first detection unit 21' receives a first input signal of the signal input terminal Vin or when the second detection unit 22 receives a second input signal of the signal input terminal Vin, the infrared light emitting device IR emits an infrared light to enable the photo-transistor P to be turned on, and the third gate terminal 733 and the third source terminal 731 of the third field effect transistor 73 are biased by the partial voltage of the sixth resistor R6 and the seventh resistor R7. Consequently, the third drain terminal 732 and the third source terminal 731 of the third field effect transistor 73 are turned on, and finally the second light emitting device D2 can emit light. If the first detection unit 21' does not receive the first input signal of the signal input terminal Vin or the second detection unit 22 does not receive the second input signal of the signal input terminal Vin, the Infrared light emitting device IR surely cannot emit infrared light for the photo-transistor P to be turned on, causing the third field effect transistor 73 not to be turned on such that the second light emitting device D2 cannot emit light. Therefore, the dimming control unit 40 can adjust the current finally output to the light emitting device according to whether a different detection unit receives an input signal.

In addition to the circuit elements described above, the circuit of the present invention may further include other circuit elements such as a resistor R, a capacitor C, an inductance L, a diode D, or a transistor Q, etc., respectively used as a voltage divider, voltage regulator or switch. Since the other circuit element technology is not the focus of the present invention, it will not be described here.

According to the above description, the light source switching system 1, 1a, 1b of the present invention can make the second light emitting device D2 and the third light emitting device D3 emit light separately or simultaneously. Further, a fourth or fifth light-emitting element can be continuously added in parallel conveniently without re-arranging the driving element according to the requirement.

Figure 4:
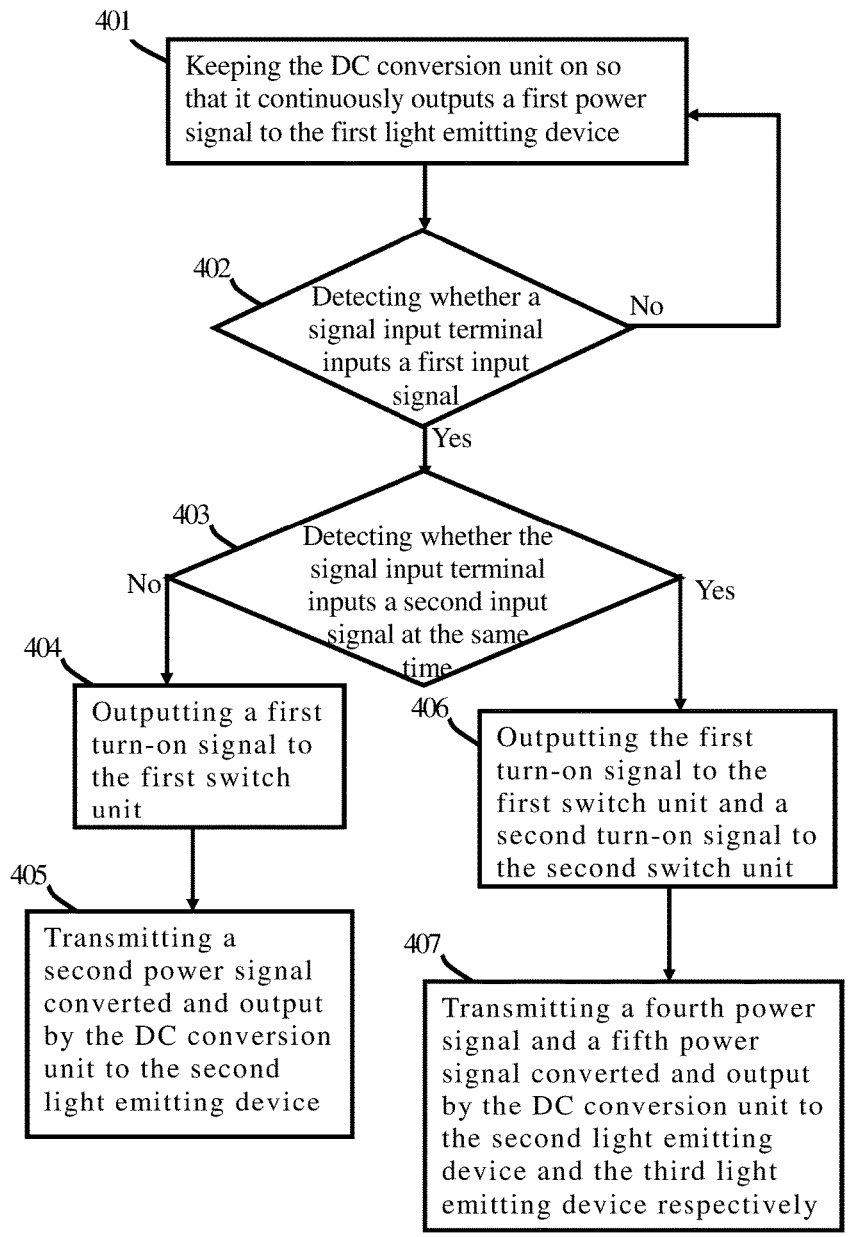
FIG. 4 is a flowchart showing steps in a method of light emission control according to the present invention.

Now, please refer to FIG. 4, which is a flowchart showing steps in the method of light emission control according to the present invention. It should be noted here that although the light source switching system 1, 1a, 1b described above is used as an example to illustrate the method for controlling the emission in the present invention, the method of light emission control of the present invention is not limited to the light source switching system 1, 1a, 1b used in the above-mentioned same structure.

Firstly, the light source switching system 1 proceeds to Step 401: Keeping the DC conversion unit on so that it continuously outputs a first power signal to the first light emitting device.

First, the first input circuit 11 is kept on so that the DC conversion unit 50 continues to output a first power signal to the first light emitting device D1, and the first light emitting device D1 is kept on.

Next, in Step 402: Detecting whether a signal input terminal inputs a first input signal.

Then the first detection unit 21 detects if the first input signal is received from the signal input terminal Vin. If no first input signal is received, go back to Step 401.

If it is detected that the first input signal is input, the method proceeds to Step 403: Detecting whether the signal input terminal inputs a second input signal at the same time.

At this time, the second detection unit 22 further confirms whether a second input signal is received from the signal input terminal Vin.

If the second input signal is not input at the same time, the method proceeds to Step 404: Outputting a first turn-on signal to the first switch unit.

In Step 404, since only the first detection unit 21 detects the first input signal, the first detection unit 21 allows the first switch driving unit 31 to output a first turn-on signal to the first switch unit.

Then follows Step 405: Transmitting a second power signal converted and output by the DC conversion unit to the second light emitting device.

Next, a second power signal converted and output by the DC conversion unit 50 is transmitted to the second light emitting device D2 such that the second light emitting device D2 emits light. It should be noted that Step 402 may be changed to detect if a second input signal is input, and then in Step 404 to Step 405, a third power signal can be output to the third light emitting device D3. Since the methods of driving the second light emitting device D2 and the third light emitting device D3 in the light source switching system 1, 1a, 1b of the present invention are basically the same, the step flow used only for the third light emitting device D3 will not be described herein.

If it is also detected that the second input signal is input in Step 403, the method proceeds to Step 406: Outputting the first turn-on signal to the first switch unit and a second turn-on signal to the second switch unit.

At this time, the first detection unit 21 enables the first switch driving unit 31 to output a first turn-on signal to the first switch unit, and the second detection unit 22 enables the second switch driving unit 32 to output a second turn-on signal to the second switch unit.

Finally, in Step 407: Transmitting a fourth power signal and a fifth power signal converted and output by the DC conversion unit to the second light emitting device and the third light emitting device respectively.

Finally, the DC conversion unit converts a fourth power signal and a fifth power signal to be respectively transmitted to the second light emitting device D2 and the third light emitting device D3 such that the second light emitting device D2 and the third light emitting device D3 can emit light simultaneously.

It should be noted that the method of light emission control in the present invention is not limited to the order of the above steps. As long as the objective of the present invention can be achieved, the order of the above steps can also be changed.

It should be noted that the preferred embodiments of the present invention described above are merely illustrative. To avoid redundancy, not all the possible combinations of changes are documented in detail. However, it shall be understood by those skilled in the art that each of the modules or elements described above may not be necessary.

For the implementation of the present invention, the present invention may also contain other detailed, conventional modules or elements. Each module or component is likely to be omitted or modified depending on specific needs. Other modules or elements may not necessarily exist between two of any modules. Furthermore, it is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A light source switching system, comprising:
a signal input terminal;
a first input circuit, which is electrically connected to the signal input terminal;
a second input circuit, comprising a first detection unit and a first switch driving unit, wherein the first detection unit is electrically connected to the signal input terminal;
a third input circuit, comprising a second detection unit and a second switch driving unit, wherein the second detection unit is electrically connected to the signal input terminal;
a dimming control unit, which is electrically connected to the second input circuit and the third input circuit;
a DC conversion unit, which is electrically connected to the first input circuit, the second input circuit, the third input circuit and the dimming control unit;
a first switch circuit, which is electrically connected to the DC conversion unit and the first switch driving unit;
a second switch circuit, which is electrically connected to the DC conversion unit and the second switch driving unit;
a first light emitting device, which is electrically connected to the DC conversion unit;
a second light emitting device, which is electrically connected to the first switch circuit; and
a third light emitting device, which is electrically connected to the second switch circuit, wherein the first light emitting device, the second light emitting device and the third light emitting device are connected in parallel with one another.

2. The light source switching system as claimed in claim 1, wherein the first input circuit is kept on such that the DC conversion unit continuously outputs a first power signal to the first light emitting device.

3. The light source switching system as claimed in claim 2, wherein when the first detection unit receives a first input signal of the signal input terminal, the first detection unit enables the first switch driving unit to output a first turn-on signal to the first switch unit to transmit a second power signal converted and output by the DC conversion unit to the second light emitting device.

4. The light source switching system as claimed in claim 3, wherein the DC conversion unit controls a current output according to the dimming control unit.

5. The light source switching system as claimed in claim 2, wherein when the second detection unit receives a second input signal of the signal input terminal, the second detection unit enables the second switch driving unit to output a second turn-on signal to the second switch unit to transmit a third power signal converted and output by the DC conversion unit to the third light emitting device.

6. The light source switching system as claimed in claim 5, wherein the DC conversion unit controls a current output according to the dimming control unit.

7. The light source switching system as claimed in claim 2, wherein when the first detection unit and the second detection unit simultaneously receive a first input signal and a second input signal of the signal input terminal, the first detection unit enables the first switch driving unit to output a first transmitting signal to the first switch unit, the second detection unit enables the second switch driving unit to output a second turn-on signal to the second switch unit, and the DC conversion unit converts and outputs a fourth power signal and a fifth power signal to be respectively transmitted to the second light emitting device and the third light emitting device.

8. The light source switching system as claimed in claim 7, wherein the DC conversion unit controls a current output according to the dimming control unit.

9. The light source switching system as claimed in claim 1, wherein the first detection unit or the second detection unit comprises a first resistor, a second resistor and a first capacitor, the first switch driving unit or the second switch driving unit comprises a Zener diode, a third resistor, a fourth resistor and a first field effect transistor, and the first switch circuit or the second switch circuit is a second field effect transistor, wherein the first field effect transistor comprises a first source terminal, a first gate terminal and a first drain terminal, and the second field effect transistor comprises a second source terminal, a second gate terminal and a second drain terminal.

10. The light source switching system as claimed in claim 9, wherein the first resistor is connected to the signal input terminal and connected in series to the second resistor, the second resistor is connected to a ground terminal and connected in parallel to the first capacitor, the first gate terminal is connected between the first resistor and the second resistor, the first source terminal is connected to the ground terminal, the third resistor is connected in parallel to the Zener diode and is connected in series to the fourth resistor, the fourth resistor is further connected to the first drain terminal, the second gate terminal is connected between the third resistor and the fourth resistor, the second drain terminal is connected to the DC conversion unit, and the second source terminal is connected to the second light emitting device or the third light emitting device.

11. The light source switching system as claimed in claim 10, wherein when the first detection unit receives a first input signal of the signal input terminal or when the second detection unit receives a second input signal of the signal input terminal, the first field effect transistor is turned on such that the second field effect transistor is turned on, and the second light emitting device or the third light emitting device emits light.

12. The light source switching system as claimed in claim 1, wherein the first detection unit or the second detection unit comprises a fifth resistor and an infrared light emitting device, the first switch driving unit or the second switch driving unit comprises a sixth resistor, a seventh resistor, a photo-transistor and a second capacitor, and the first switch circuit or the second switch circuit is a third field effect transistor, wherein the third field effect transistor comprises a third source terminal, a third gate terminal and a third drain terminal.

13. The light source switching system as claimed in claim 12, wherein the fifth resistor is connected to the signal input terminal and connected in series to the infrared light emitting device, the infrared light emitting device and the photo-transistor form an optocoupler, the sixth resistor, the seventh resistor and the photo-transistor are connected in series, the seventh resistor is connected in parallel to the second capacitor, the third gate terminal is connected between the photo-transistor and the seventh resistor, the third source terminal is connected to the opposite end of the seventh resistor, and the third drain terminal is connected to the second light emitting device or the third light emitting device.

14. The light source switching system as claimed in claim 13, wherein when the first detection unit receives a first input signal of the signal input terminal or when the second detection unit receives a second input signal of the signal input terminal, the infrared light emitting device emits an infrared light such that the photo-transistor is turned on, and the third field effect transistor is turned on such that the second light emitting device or the third light emitting device emits light.

15. A method of light emission control, which is used in a light source switching system, the light source switching system comprising a signal input terminal, a first switch unit, a DC conversion unit and a first light emitting device, the method comprising:
    detecting if the signal input terminal receives a first input signal;
    if yes, outputting a first turn-on signal to the first switch unit and transmitting a first power signal converted and output by the DC conversion unit to the first light emitting device.

16. The method of light emission control as claimed in claim 15, the light source switching system further comprises a second switch unit and a second light emitting device, the method further comprising the following steps:
    detecting if the signal input terminal simultaneously inputs the first input signal and a second input signal;
    if yes, outputting the first turn-on signal to the first switch unit and a second turn-on signal to the second switch unit and
    transmitting a second power signal and a third power signal converted and output by the DC conversion unit to the first light emitting device and the second light emitting device respectively.

17. The method of light emission control as claimed in claim 16, wherein the light source switching system further comprises a third light emitting device, the method further comprising the following step:
    keeping the DC conversion unit on such that it continuously outputs a fourth power signal to the third light emitting device.

18. The method of light emission control as claimed in claim 15, wherein the light source switching system further comprises a third light emitting device, the method further comprising the following step:
    keeping the DC conversion unit on such that it continuously outputs a fourth power signal to the third light emitting device.

* * * * *